(12) United States Patent
Gunzelmann et al.

(10) Patent No.: US 7,308,038 B2
(45) Date of Patent: Dec. 11, 2007

(54) TRANSMISSION CONFIGURATION, IN PARTICULAR FOR MOBILE RADIO COMMUNICATION, AND MOBILE STATION WITH THE TRANSMISSION CONFIGURATION

(75) Inventors: Bertram Gunzelmann, Augsburg (DE); Dietmar Wenzel, München (DE)

(73) Assignee: Infineon Technologies AG, Munich (DE)

( * ) Notice: Subject to any disclaimer, the term of this patent is extended or adjusted under 35 U.S.C. 154(b) by 752 days.

(21) Appl. No.: 10/705,514

(22) Filed: Nov. 10, 2003

(65) Prior Publication Data
US 2004/0097250 A1    May 20, 2004

Related U.S. Application Data

(63) Continuation of application No. PCT/DE02/01673, filed on May 8, 2002.

(30) Foreign Application Priority Data
May 8, 2001    (DE) ................. 101 22 196

(51) Int. Cl.
*H04L 27/00* (2006.01)
(52) U.S. Cl. ...................................... 375/295
(58) Field of Classification Search ................. 375/295
See application file for complete search history.

(56) References Cited
U.S. PATENT DOCUMENTS
6,011,785 A    1/2000 Carney et al.
6,370,386 B1 *  4/2002 Williams ................. 455/452.1

FOREIGN PATENT DOCUMENTS
DE    100 35 116 A1    1/2002
GB    2 350 755 A       12/2000
WO    99/10976          3/1999
WO    01/29980 A1       4/2001

OTHER PUBLICATIONS

Lucent Technologies, "W7020 Bluetooth Radio Module," Preliminary Data Sheet, Sep. 2000, 36 pages.*
Author not listed: "W7020 Bluetooth Radio Module", Lucent Product Note, Lucent Technologies Inc., Dec. 1999, 2 pages.
Author not listed: "National Semiconductor—Führend bei System-on-a-Chip-Designs" [National Semiconductor—Leading in System-on-a-Chip-Designs, Elektronik Industrie, Dec. 1998, pp. 86-87 and one drawing.

* cited by examiner

*Primary Examiner*—David C. Payne
*Assistant Examiner*—Nader Bolourchi
(74) *Attorney, Agent, or Firm*—Laurence A. Greenberg; Werner H. Stemer; Ralph E. Locher

(57) ABSTRACT

A transmission configuration with a baseband module and a radio-frequency module is particularly suitable for transmission for mobile radio purposes. An interface which is designed on an exclusively digital basis is provided between the baseband module and the radio-frequency module and preferably ensures completely separate transmission of payload data and configuration data. The described principle allows the baseband module to be designed on a completely digital basis, and allows a high degree of flexibility by combination of a single baseband module with two or more different radio-frequency modules.

20 Claims, 2 Drawing Sheets

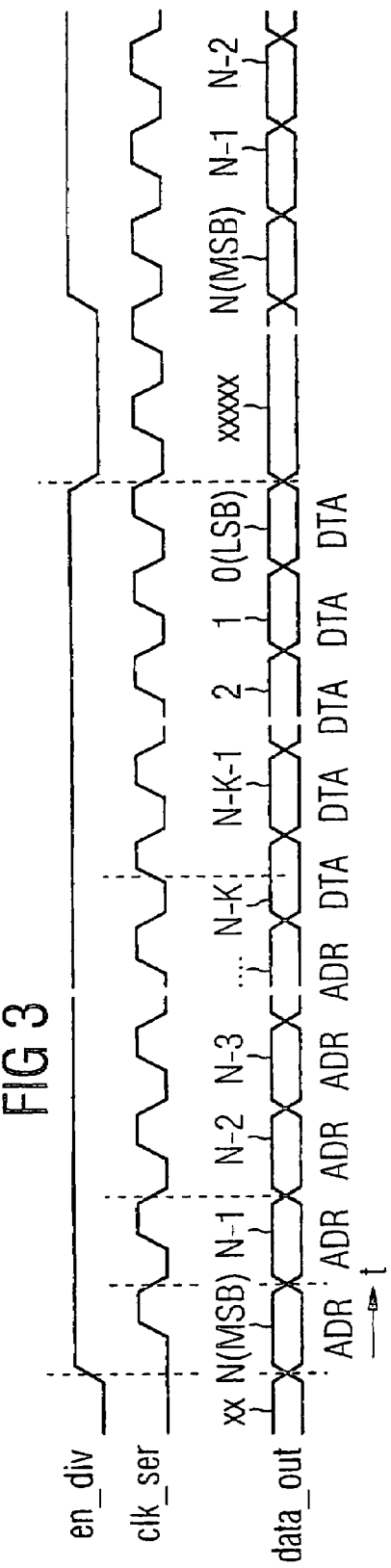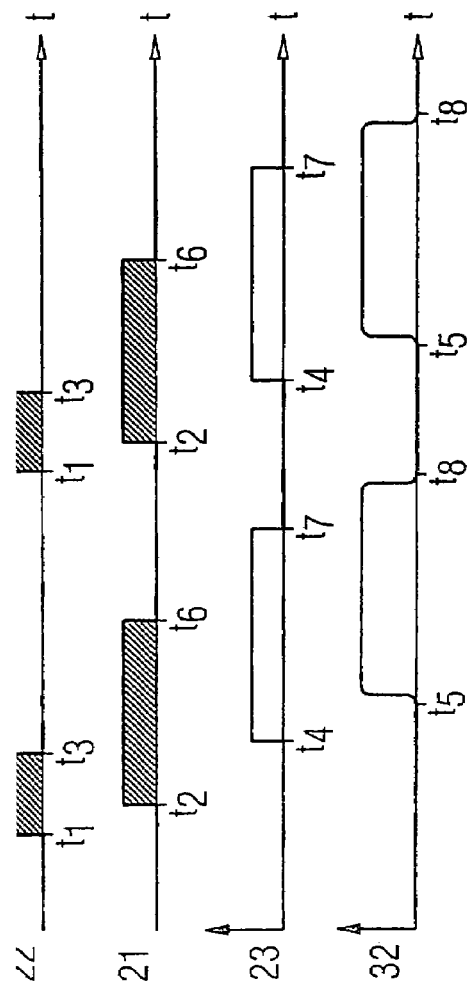

TRANSMISSION CONFIGURATION, IN PARTICULAR FOR MOBILE RADIO COMMUNICATION, AND MOBILE STATION WITH THE TRANSMISSION CONFIGURATION

CROSS-REFERENCE TO RELATED APPLICATION

This application is a continuation of copending International Application No. PCT/DE02/01673, filed May 8, 2002, which designated the United States and which was not published in English.

BACKGROUND OF THE INVENTION

Field of the Invention

The present invention relates to a transmission configuration, in particular for mobile radio, and to the implementation of such a transmission configuration in a transmission method.

In mobile radio, a distinction is normally drawn between mobile stations and fixed stations, with two or more mobile stations being able to communicate with one fixed or base station at the same time.

A carrier frequency is modulated with data to be transmitted, such as speech data or text data, by means of modulators in transmission devices for mobile stations, in accordance with standardized modulation methods, such as GSM (Global System for Mobile Communication), EDGE, TIA-EIA136, UTRA FDD (UMTS, Universal Mobile Telecommunication Standard), UTRA TDD, IS-95 etc. Normally, modulators such as these have two or more functional units, for example a baseband part and a radio-frequency part. The baseband part is used to produce a signal, which is normally a complex value and complies with a standard, by means of digital signal processing from the data to be transmitted. This complex-value signal is shifted in the radio-frequency part to a radio-frequency level, for example using a homodyne or heterodyne transmission architecture, and is transmitted as a real-value signal via a radio channel, for example by means of an antenna, after suitable power amplification.

Since the baseband part and radio-frequency part are subject to different physical requirements, these functional units are generally in the form of integrated circuits (chips), which are separate from one another and are produced by way of different production processes. In this case, a suitable interface must be provided between the baseband component and the radio-frequency component and, at the current state of the art, is normally in the form of an analog signal interface. The baseband signals are thereby normally produced as complex baseband signals at this interface, are broken down into a real part and an imaginary part, as the so-called IQ signal with an in-phase component and a quadrature component that is phase-shifted through 90° with respect to the in-phase component. The I and Q components are in this case each generally transmitted as a difference signal, so that once again two lines need to be provided in each case. In addition to the large number of interface lines required as a consequence of this and, accordingly, a large number of pins for the integrated circuits involved, this known signal transmission requires high-quality analog signal processing components, such as digital/analog converters and amplifiers, both on the radio-frequency side and on the baseband side.

Furthermore, special signal processing steps relating to the radio-frequency part normally have to be carried out in the baseband circuit part, in order to compensate for and to correct in advance for incompatibilities, non-ideal features or tolerances in the radio-frequency part. In consequence, it is no longer possible to consider, analyze and develop the baseband part independently of the radio-frequency part. The continuous development in the field of digital signal processing and of modular concepts has resulted in an increase in the proportion of processing in baseband in comparison to the overall signal processing path to an ever greater extent, in particular with regard to the interaction with the radio-frequency part. This has undesirably resulted in restricted flexibility of baseband modules or baseband chips, since the baseband modules can now be used only together with that radio-frequency assembly which has been developed especially for it.

SUMMARY OF THE INVENTION

It is accordingly an object of the invention to provide a transmission configuration, in particular for mobile radio, as well as an implementation of the transmission configuration, which overcomes the above-mentioned disadvantages of the heretofore-known devices and methods of this general type and which makes it possible to achieve a high degree of flexibility, that is to say which allows baseband processing independently of the radio-frequency part, while having a low degree of complexity, in particular a small number of pins.

With the foregoing and other objects in view there is provided, in accordance with the invention, a transmission configuration, in particular for mobile radio transmission, comprising:

a baseband component for processing a baseband signal, the baseband component having an input/output configured for digital data transmission;

a radio-frequency component for conversion of the baseband signal to a radio-frequency signal to be transmitted, the radio-frequency component having an input/output for digital data transmission and being connected, via an interface, to the input/output of the baseband component for digital transmission of payload data to be transmitted and of configuration data for configuration of the radio-frequency component;

a first digital multiple conductor connection for transmitting the payload data connected between the input/output of the baseband component and the input/output of the radio-frequency component; and a second digital multiple conductor connection for transmitting the configuration data connected between the input/output of the baseband component and the input/output of the radio-frequency component.

In a first embodiment of the invention, the first digital multiple conductor connection includes:

a data line for serial data transmission of payload data;

a bit clock line for transmission of a clock signal, with in each case one bit of the data line being associated with in each case one clock period; and a word clock line for indicating a start of transmission of a sequence of bits on the data line.

In a second embodiment of the invention, the second digital multiple conductor connection includes:

a data line for serial data transmission of the configuration data;

a bit clock line for transmitting a clock signal with one clock period each associated with one bit each on the data line; and a selection line for activating the radio-frequency component.

In this context, payload data to be transmitted means that data which is modulated onto a carrier frequency in the radio-frequency part and, for example, is transmitted by an antenna. The data may also be referred to as useful data.

The expression configuration data means that data with which the radio-frequency component can be configured for example the type of modulation in the transmitter, the amplitude, the transmission power profile, the transmission frequency, the transmission time, the transmission duration, the transmission mode, the switching-on and off behavior of the transmitter, the so-called power ramping, and so on.

The described digital interface between the baseband component and the radio-frequency component advantageously offers baseband processing independently of the radio-frequency part. No analog circuit components are required in the transmission signal path in the baseband component, so that a high degree of integration density and, in particular, a high degree of independence of manufacturing scatters can be ensured. There is no need whatsoever for an analog interface between the baseband part and the radio-frequency part. Both modulation data (payload data) and configuration data can be transmitted from the baseband part to the radio-frequency part via the described digital interface. Furthermore, the described digital interface requires only a small number of lines, as well as low data rates.

Signal processing steps can be carried out at the information bit level in the baseband component, for example the formation of transport blocks, error protection coding, adaptation of the bit rate, channel coding such as convolutional and/or turbo coding, interleaving, transport stream multiplexing, frame and packet segmentation and so on. Those signal processing steps at the physical level which correspond to layer 1 of the OSI layer model, such as pulse shaping, modulation, advance correction and compensation, can be carried out by means of the described digital interface completely in the radio-frequency component, and accordingly independently of the baseband.

Overall, the described transmission configuration is particularly suitable for use in mobile radio stations, to support the GSM, EDGE TIA/EIA136 mobile radio standards, as well as to support third-generation mobile radio standards such as, for example, UTRA FDD, UTRA TDD or IS-95.

The exclusively digital interface allows a considerably simpler circuit layout and circuit design in the baseband module and radio-frequency module. Furthermore, a considerably higher degree of flexibility is obtained as a result of the fact that those digital signal processing steps that are required for compensation and/or for advance correction of the radio-frequency signals can be carried out directly in the radio-frequency assembly, that is to say in the radio-frequency component, so that, depending on the application, one baseband module can be coupled to different radio-frequency modules.

The exclusively digital form of the baseband module allows the use of low-cost production processes with little complexity, since no analog circuit components need be integrated.

Furthermore, this allows matching to future manufacturing processes with high integration densities, with a very low level of complexity.

The baseband component and the radio-frequency component may be integrated circuits (chips) that are separate from one another.

As noted above, a first multiple conductor connection is provided for transmission of the payload data, is connected at one end to the input/output of the baseband component and is connected at the other end to the input/output of the radio-frequency component, and in which a second multiple conductor connection is provided for transmission of the configuration data, is connected at one end to the input/output of the baseband component, and is connected at the other end to the input/output of the radio-frequency component.

The separate data transmission of payload data and configuration data via the first and second multiple conductor connections simplifies and separates the configuration of the signal processing in the baseband module since, normally, the payload information and the configuration information are normally respectively provided separately from a digital signal processor in the baseband module and from a microcontroller in the baseband module, and are also transmitted independently of one another via the digital interface when using the present configuration.

As has already been described, the payload data mainly comprises the modulation data for the radio-frequency module for modulation of a carrier frequency, while the configuration data comprises the information for configuration of the radio-frequency component itself, for example the transmission frequency, the transmission amplitude, the transmission power and other transmission parameters.

The separate digital transmission of payload data and configuration data is advantageously carried out by means of message-oriented or packet-oriented transmission protocols.

Separate inputs/outputs, which are provided independently of one another, can respectively be formed in the baseband component and in the radio-frequency component for the first and second multiple conductor connections.

By way of example, the baseband module may have a first input/output which is coupled to the digital signal processors for transmission of the payload data, while a second input/output can be provided on the baseband component for transmission of the configuration data, and is coupled to the microcontroller in the baseband component.

The radio-frequency component preferably comprises a modulator, a digital/analog converter as well as a frequency converter for conversion of a signal from baseband to a radio-frequency signal. Furthermore, a power amplifier may be provided, whose output is coupled to an antenna.

As noted above, the first digital multiple conductor connection, in the first aspect of the invention, comprises a data line designed for serial data transmission, a bit clock line designed for transmission of a clock signal, with in each case one bit of the data line being associated with in each case one clock period, and a word clock line designed for indication of the start of transmission of a sequence of bits on the data line.

The data to be transmitted via the data line can be organized in transmission units, so-called messages, which each comprise, for example, 16 bits arranged in serial form. A transmission pulse (Burst) from the transmission circuit may once again comprise, for example, a sequence with a total of 11 messages, each having a length of 16 bits, for GSM.

Owing to the relatively small amounts of data to be transmitted, serial digital transmission methods can advantageously be used, in particular with standardized transmission protocols or modified transmission protocols such as I²S or I²C.

In a further preferred embodiment to the present invention, the second digital multiple conductor connection comprises a data line designed for serial data transmission of the configuration data, a bit clock line for transmission of a clock signal, with in each case one clock period being associated with in each case one bit to be transmitted on the data line, and a selection line for activation of the radio-frequency component, or of a circuit element in the radio-frequency component.

The configuration data may also be transmitted via a second digital multiple conductor connection, which is in the form of a three-conductor interface, with the transmission protocol preferably being organized in messages. These may be individual messages or a group of messages which follow one another immediately. Since, with regard to the present subject matter, the payload data can be transmitted completely independently of the configuration data, this means that it is possible, for example, for a microcontroller in the baseband module to transmit transmission parameters to the radio-frequency assembly at times which it determines itself, without this having any influence on the digital signal processor in the baseband module, and without there even being any need for any interrupt in the payload data transmission or processing. This considerably simplifies the timing, and its coordination, in the baseband component.

Configuration data determines, for example, the type of modulation, such as GMSK or QAM, the amplitude, the transmission power profile, the transmission frequency, the transmission time, the transmission duration, the transmission mode, the switching-on and off behavior of the transmitter, etc.

In a further preferred embodiment to the present invention, a synchronization line is provided for synchronization of the payload data in the radio-frequency component, is connected at one end to the input/output of the baseband component, and is connected at the other end to the input/output of the radio-frequency component.

The synchronization line allows synchronization data to be transmitted defining the time of the respective start and end of transmission on the output side of the radio-frequency component, that is to say at the radio-frequency carrier level, for example when transmitting in time slots, so-called bursts.

In a further preferred embodiment of the present invention, the inputs/outputs of the baseband and radio-frequency components are designed for serial data transmission. Serial data transmission, in the present case serial digital data transmission, advantageously allows the use of digital transmission methods with standardized transmission protocols, such as I²S or I²C on the basis of the small amounts of data to be transmitted in this case.

In a further preferred embodiment of the present invention, the inputs/outputs of the base band component and radio-frequency component are designed for unidirectional data transmission from the baseband component to the radio-frequency component, but not in the opposite direction. This makes it possible to achieve a considerable reduction in the complexity for implementation of the described digital interface.

In a further preferred embodiment of the present invention, a digital interrupt request line is connected between the baseband component and the radio-frequency component, for initiating resumption of the data transmission of the baseband component through the radio-frequency component.

In a further preferred embodiment of the present invention, an additional control line for driving a power amplifier for amplification of the radio-frequency signal is provided between the baseband component and the radio-frequency component. The power amplifier may, for example, be provided on the output side in the radio-frequency component and may, for example, provide a coupling to an antenna from a frequency converter which converts baseband to radio-frequency. In order to drive the power amplifier, in particular its switching-on and off behavior, or power ramping, it may be preferable to use an analog drive rather than a digital drive for the power amplifier, depending on the application, which involves a low degree of circuitry complexity.

Other features which are considered as characteristic for the invention are set forth in the appended claims.

Although the invention is illustrated and described herein as embodied in a transmission configuration, in particular for mobile radio, as well as use of a transmission configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 illustrates examples of signal waveforms for the configuration data for transmission via the interface shown in FIG. 1; and FIG. 4 is a graph of the signal waveforms to show the relationship between the transmission of configuration data, payload data and synchronization data, as well as the fundamental waveform of the transmission power via the interface as shown in FIG. 1.

DESCRIPTION OF THE PREFERRED EMBODIMENTS

Figure 1:
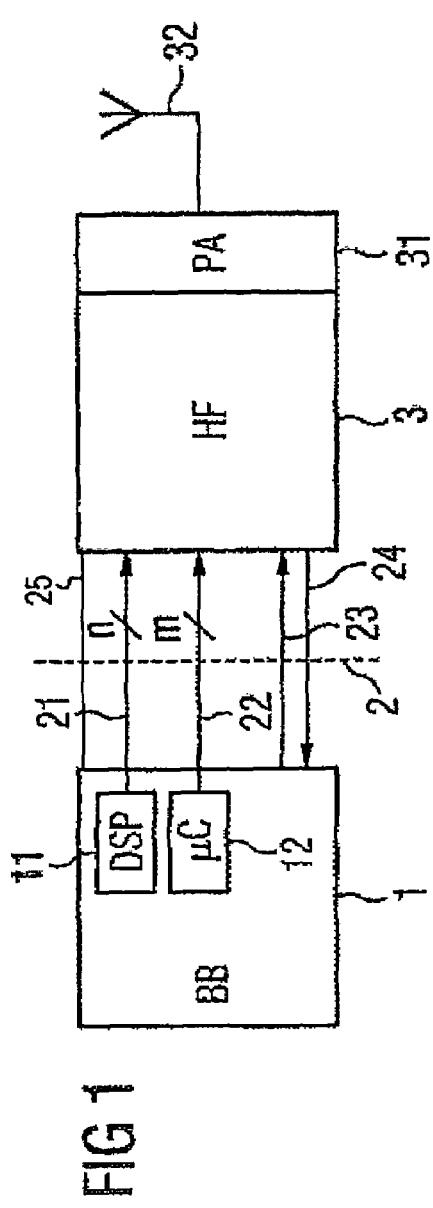
FIG. 1 is a simplified block diagram showing a first exemplary embodiment of the present invention.

Referring now to the figures of the drawing in detail and first, particularly, to FIG. 1 thereof, there is shown a transmission circuit with a baseband component 1 and radio-frequency component 3 which is connected to it via an interface 2. The baseband component 1 is used for digital processing of useful data, referred to as payload data herein, to be transmitted. The baseband component 1 comprises a digital signal processor 11 for processing the payload data, as well as a microcontroller 12 for controlling the radio-frequency component by means of the configuration data, as well as for overall sequence control.

The radiofrequency component 3 in the present exemplary embodiment comprises a power amplifier 31 which, in alternative embodiments, may also be in the form of an external component, separately from the radio-frequency module 3. In one preferred embodiment of the present invention, an additional control line 25 for driving a power amplifier for amplification of the radio-frequency signal is provided between the baseband component and the radio-frequency component. The output side of the power amplifier 31 is connected to an antenna via an antenna line 32 which is designed for transmission of radio-frequency modulated signals.

The interface 2 between the baseband component 1 and the radio-frequency component 3 comprises a first multiple conductor connection 21, designed for transmission of the payload data which is provided from the digital signal processor 11, a second digital multiple connection 22, designed for transmission of configuration data for controlling the radio-frequency component 3 and coupled to the microcontroller 12 in the baseband component 1, a synchronization line 23 for definition of the start and end of the transmission-time slots in the transmission signal 32, as well as an interrupt request line 24, by means of which the radio-frequency module 3 causes the baseband module 1 to carry out a new action, in particular to transmit data once again.

While the two multiple conductor connections 21, 22 as well as the synchronization line 22 are in the form of unidirectional data lines in the present exemplary embodiment, that is to say they are designed to transmit only in the direction from the baseband component 1 to the radio-frequency component 3, the interrupt request line 24 is designed for transmission in an opposite signal direction from the radio-frequency component 3 to the baseband component 1.

Since the interface 2 is an exclusively digital interface, the base module 1 can advantageously be designed completely using digital circuitry. Furthermore, the complete separation of the respective digital payload data transmission from the configuration data transmission allows the baseband component 1 configuration to be considerably simplified, since there is no coupling of data provided from the digital signal processor 11 and data provided from the microcontroller 12. Furthermore, there is no need for the hybrids (that is to say partially analog and partially digital circuitry) which were previously normally used in baseband modules.

In addition, the interface 2 has only 8 lines, namely in each case three lines for the digital multiple conductor connections and in each case one line for the synchronization and interrupt request, thus allowing the chips that are involved to have a small number of pins.

Figure 2:
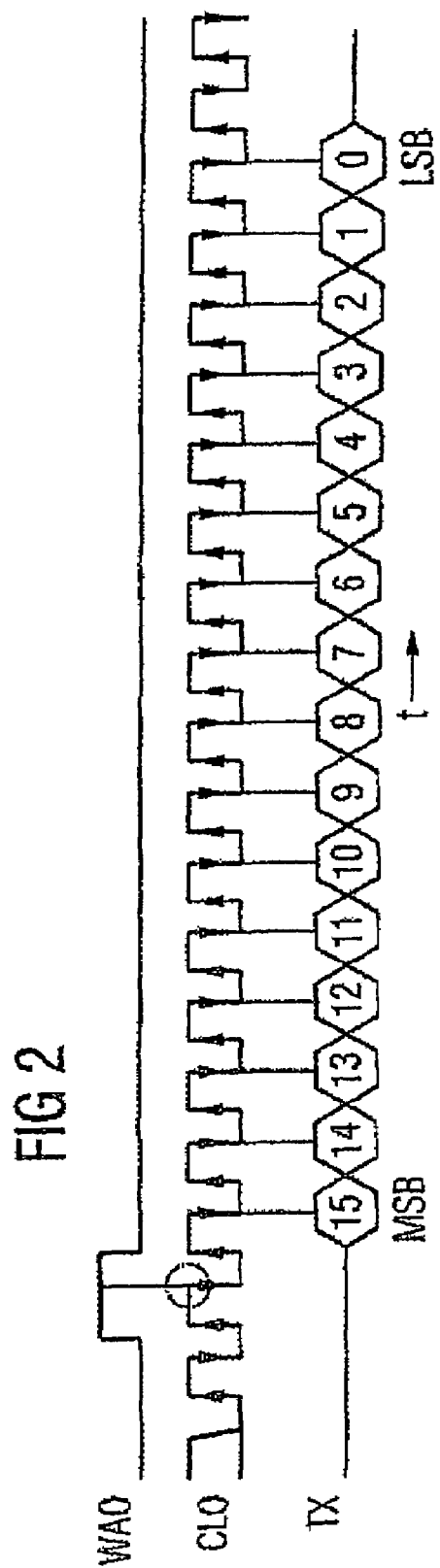
FIG. 2 is a timing line shows examples of signal waveforms on the three-conductor connection for transmission of the payload data via the interface shown in FIG. 1.

By way of example, FIG. 2 shows signal waveforms on the three lines comprising the word line WA0, the bit clock line CL0 and the data line TX which are formed from the first digital multiple conductor connection 21. This first digital multiple conductor connection 21 is a modified unidirectional I²S interface which has in each case one line connection for the word clock, for the bit clock and for the data transmission, WA0, CL0, TX. The serial transmission of the data via the line TX is in this case organized in the form of messages, with a message in the present example comprising 16 bits arranged in serial form. In this case, the most significant bit (MSB) is transmitted first of all, and the least significant bit (LSB) is transmitted last. In the present case, the most significant bit is used to identify whether the fifteen less significant bits contain payload information, that is to say modulation bits for modulation of a carrier oscillation in the radio-frequency component, or control information, that is to say data for controlling the serial transmission or the nature of the serial transmission and the transport format for the payload data, that is to say whether these are modulation bits for Gaussian minimum shift keying, EDGE or other types of modulation. One modulation bit on the data line TX is in each case clocked into the radio-frequency component 3 on each falling clock edge of the periodic clock signal CL0, the so-called bit clock. The word clock signal WA0 defines the start of the transmission of a message by a falling clock edge in the bit clock occurring at the same time as a word clock pulse. The data transmission then starts on the next falling clock edge of the bit clock.

Table 1 is shown below, and, by way of example, shows the transmission of 157 modulation bits of a complete GSM transmission pulse (burst) for GMSK modulation as a sequence of a total of 11 messages, each with a length of 16 bits. The MSB is zero, so that the transmitted bits are payload data, in this case modulation bits.

TABLE 1

| No. | Message | | | | | | | | | | | | | | | | Content |
|---|---|---|---|---|---|---|---|---|---|---|---|---|---|---|---|---|---|
| 1 | 0 | 14 | 13 | 12 | 11 | 10 | 9 | 8 | 7 | 6 | 5 | 4 | 3 | 2 | 1 | 0 | 0-14 |
| 2 | 0 | 29 | 28 | 27 | 26 | 25 | 24 | 23 | 22 | 21 | 20 | 19 | 18 | 17 | 16 | 15 | 15-29 |
| 3 | 0 | 44 | 43 | 42 | 41 | 40 | 39 | 38 | 37 | 36 | 35 | 34 | 33 | 32 | 31 | 30 | 30-44 |
| 4 | 0 | 59 | 58 | 57 | 56 | 55 | 54 | 53 | 52 | 51 | 50 | 49 | 48 | 47 | 46 | 45 | 45-59 |
| 5 | 0 | 74 | 73 | 72 | 71 | 70 | 69 | 68 | 67 | 66 | 65 | 64 | 63 | 62 | 61 | 60 | 60-74 |
| 6 | 0 | 89 | 88 | 87 | 86 | 85 | 84 | 83 | 82 | 81 | 80 | 79 | 78 | 77 | 76 | 75 | 75-89 |
| 7 | 0 | 104 | 103 | 102 | 101 | 100 | 99 | 98 | 97 | 96 | 95 | 94 | 93 | 92 | 91 | 90 | 90-104 |
| 8 | 0 | 119 | 118 | 117 | 116 | 115 | 114 | 113 | 112 | 111 | 110 | 109 | 108 | 107 | 106 | 105 | 105-119 |
| 9 | 0 | 134 | 133 | 132 | 131 | 130 | 129 | 128 | 127 | 126 | 125 | 124 | 123 | 122 | 121 | 120 | 120-134 |
| 10 | 0 | 149 | 148 | 147 | 146 | 145 | 144 | 143 | 142 | 141 | 140 | 139 | 138 | 137 | 136 | 135 | 135-149 |
| 11 | 0 | 0 | 0 | 0 | 0 | 0 | 0 | 0 | 0 | 156 | 155 | 154 | 153 | 152 | 151 | 150 | 150-156 |

By way of example, Table 2 below, shows the transmission of control data for controlling the serial transmission via the payload data connection. The MSB is 1, and this therefore indicates that the message contains control information.

TABLE 2

| Message title | Bit number | | | | | | | | | | | | | | | | Description |
|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | |
| GMSK | 1 | 0 | 0 | 0 | 0 | 0 | 0 | 0 | 0 | 0 | 0 | 0 | 0 | 0 | 0 | 1 | This message is followed by 11 further messages with modulation bits for a GMSK transmission pulse as shown in Table 1 |

TABLE 2-continued

| Message title | \multicolumn{16}{c}{Bit number} | Description |
|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | |
| EDGE | 1 | 0 | 0 | 0 | 0 | 0 | 0 | 0 | 0 | 0 | 0 | 0 | 0 | 0 | 1 | 0 | This message is followed by 32 further messages with modulation bits for an EDGE transmission pulse |
| Empty buffer | 1 | 0 | 0 | 0 | 0 | 0 | 0 | 0 | 0 | 1 | 0 | 0 | 0 | 0 | 0 | 0 | Previously transmitted data is invalid, empty the input buffer |
| IRQ empty | 1 | 0 | 0 | 0 | 0 | 0 | 0 | 0 | 1 | 0 | x | x | x | x | x | x | Initiate an interrupt request (IRQ) when there are only more xxxxxx$_B$ unprocessed messages in the input buffer |
| IRQ full | 1 | 0 | 0 | 0 | 0 | 0 | 0 | 0 | 1 | 1 | x | x | x | x | x | x | Initiate an interrupt request (IRQ) when there is only more space for xxxxxx$_B$ messages in the input buffer |

FIG. 3 shows the waveform of the signals via the total of three lines in the second digital multiple conductor connection 22 as shown in FIG. 1, based on an example. The second digital multiple conductor connection 22 is also designed for serial data transmission via the line data_out and additionally has a line for the bit clock clk_ser, as already described in FIG. 2, as well as a third line en_div for module selection, by means of which the module 3 which receives the configuration data or a circuit element of it, can be activated. The transmission protocol for the configuration data via the line 22 is also organized on a message basis, in which case the messages may either be individual messages or a group of messages which follow one another immediately. A message in this case comprises a defined total of N+1 bits, for example 24 bits, and is composed of an address part and a data part. The address part in this case comprises K bits and is identified by ADR, while the data part is identified by DTA and comprises N-K+1 bit. In the case of a message group transmitting data to successive addresses, the address part may be omitted if the initial address is known to the receiver. The receiver in this case is the radio-frequency module 3 which in this case receives configuration data, but transmits radio-frequency data via an antenna. The address then determines the destination, for example a function block to which the data should be transmitted in a radio-frequency module 3.

As is evident from FIGS. 2 and 3 in conjunction with FIG. 1, the microcontroller 12 can transmit transmission parameters to the radio-frequency module 3, independently of payload data transmission, at times which it defines itself, without this influencing the digital signal processor 11 or the digital signal processor 11 even having to interrupt its processing or transmission of payload data, thus, overall, considerably simplifying the timing and sequence control in the baseband module 1.

Configuration data such as the type of modulation, the amplitude, the transmission power profile, the transmission frequency, the transmission time, the transmission duration, the transmitter mode, the switching on and off behavior of the transmitter, etc., are transmitted via the second multiple conductor connection 22.

A specific configuration message may be used for transmission of a message group, defining the start, the length and the start/destination address of the group, before the start of the message group. A message group is used, for example, to set the basic configuration for the transmitter efficiently with regard to time.

During the transmission of individual messages, the time of message transmission normally also determines the time at which the new setting becomes effective.

Data can also optionally be transmitted from the radio-frequency part to the baseband part by implementation of an additional connecting line, which is not illustrated in FIG. 3, with this data having previously been requested by means of a specific request message from the baseband part. This request message may, for example, be characterized in that one bit in the address part is used to indicate that this is intended to be a read access rather than a write access to the address.

Finally, FIG. 4 shows the relationship between the transmission of payload data, configuration data and synchronization data, as well as the fundamental profile of the transmission power for a GSM-control transmission signal 32 as shown in FIG. 1. The payload data is in this case transmitted via the first multiple conductor connection 21, the configuration data is transmitted via the second digital multiple conductor connection 22, and the synchronization data is transmitted via the synchronization line 23, as is shown in FIG. 1.

First of all, this ensures that all the configuration data that is required for transmission from the radio-frequency component via an antenna has been transmitted via the second digital multiple conductor connection 22 to the radio-frequency assembly 3, and also that a sufficiently large number of modulation bits have been written via the first digital multiple conductor connection 21 to an input buffer for the radio-frequency assembly 3. A start signal can then be passed via the synchronization line 23 to the modulator in the radio-frequency component 3, in order to start the modulation and transmission processes. For example, a rising edge identifies the transmission start, and a falling edge identifies an end of a transmission time slot (burst).

Overall, the times t1 to t8 denote the following significant times for synchronization of the transmitter:
t1 Start of transmission of configuration information,
t2 Start of transmission of payload information,
t3 End of transmission of configuration information,
t4 Start of the modulator,
t5 Start of the upward power ramp,
t6 End of the transmission of payload information,
t7 Initiation of the transmission pulse,
t8 End of the downward power ramp.

We claim:

1. A transmission configuration, comprising:
a baseband component for processing a baseband signal, said baseband component having an input/output configured for digital data transmission;
a radio-frequency component for conversion of the baseband signal to a radio-frequency signal to be transmitted, said radio-frequency component having an input/output for digital data transmission and being connected, via an interface, to said input/output of said baseband component for digital transmission of payload data to be transmitted and of configuration data for configuration of said radio-frequency component;
a first digital multiple conductor connection for transmitting the payload data connected between said input/output of said baseband component and said input/output of said radio-frequency component; and
a second digital multiple conductor connection for transmitting the configuration data connected between said input/output of said baseband component and said input/output of said radio-frequency component;
said first digital multiple conductor connection including:
a data line for serial data transmission of payload data;
a bit clock line for transmission of a clock signal, with in each case one bit of the data line being associated with in each case one clock period; and
a word clock line for indicating a start of transmission of a sequence of bits on said data line.

2. The transmission configuration according to claim 1, wherein said radio-frequency component is configured for mobile radio transmission.

3. The transmission configuration according to claim 1, wherein said second digital multiple conductor connection comprises:
a data line for serial data transmission of the configuration data;
a bit clock line for transmitting a clock signal, with one clock period each associated with one bit each on the data line; and
a selection line for activating the radio-frequency component.

4. The transmission configuration according to claim 1, which comprises a synchronization line, for synchronization of the payload data in said radio-frequency component, connected between said input/output of said baseband component and said input/output of said radio-frequency component.

5. The transmission configuration according to claim 1, wherein said input/output of said baseband component and said input/output of said radio-frequency component are serial data transmission interfaces.

6. The transmission configuration according to claim 1, wherein said input/output of said baseband component and said input/output of said radio-frequency component are serial data transmission interfaces are configured for unidirectional data transmission from said baseband component to said radio-frequency component.

7. The transmission configuration according to claim 1, which further comprises a control line for driving a power amplifier for amplification of the radio-frequency signal connected between said baseband component and said radio-frequency component.

8. A transmission configuration, comprising:
a baseband component for processing a baseband signal, said baseband component having an input/output configured for digital data transmission;
a radio-frequency component for conversion of the baseband signal to a radio-frequency signal to be transmitted, said radio-frequency component having an input/output for digital data transmission and being connected, via an interface, to said input/output of said baseband component for digital transmission of payload data to be transmitted and of configuration data for configuration of said radio-frequency component;
a first digital multiple conductor connection for transmission of the payload data connected between said input/output of said baseband component and said input/output of said radio-frequency component; and
a second digital multiple conductor connection for transmission of the configuration data connected between said input/output of said baseband component and said input/output of said radio-frequency component;
said second digital multiple conductor connection including:
a data line for serial data transmission of the configuration data;
a bit clock line for transmitting a clock signal with one clock period each associated with one bit each on the data line; and
a selection line for activating said radio-frequency component.

9. The transmission configuration according to claim 8, wherein said radio-frequency component is configured for mobile radio transmission.

10. The transmission configuration according to claim 8, which comprises a synchronization line, for synchronization of the payload data in said radio-frequency component, connected between said input/output of said baseband component and said input/output of said radio-frequency component.

11. The transmission configuration according to claim 8, wherein said input/output of said baseband component and said input/output of said radio-frequency component are serial data transmission interfaces.

12. The transmission configuration according to claim 8, wherein said input/output of said baseband component and said input/output of said radio-frequency component are serial data transmission interfaces are configured for unidirectional data transmission from said baseband component to said radio-frequency component.

13. A transmission configuration, comprising:
a baseband component for processing a baseband signal, said baseband component having an input/output configured for digital data transmission;
a radio-frequency component for conversion of the baseband signal to a radio-frequency signal to be transmitted, said radio-frequency component having an input/output for digital data transmission and being connected, via an interface, to said input/output of said baseband component for digital transmission of payload data to be transmitted via a first multiple conductor connection, and of configuration data for configuration of said radio-frequency component via a second multiple conductor connection, separate from said first multiple conductor connection;

a digital interruption request line connected between said baseband component and said radio-frequency component.

14. The transmission configuration according to claim 13, wherein said digital interruption request line is configured for initiating resumption of the data transmission of said baseband component through said radio-frequency component.

15. The transmission configuration according to claim 13, wherein said radio-frequency component is configured for mobile radio transmission.

16. The transmission configuration according to claim 13, which further comprises a control line for driving a power amplifier for amplification of the radio-frequency signal connected between said baseband component and said radio-frequency component.

17. In a mobile radio system having a base station and at least one mobile station, a mobile station including the transmission configuration according to claim 1 for communication with the base station.

18. In a mobile radio system having a base station and at least one mobile station, a mobile station including the transmission configuration according to claim 8 for communication with the base station.

19. In a mobile radio system having a base station and at least one mobile station, a mobile station including the transmission configuration according to claim 13 for communication with the base station.

20. The transmission configuration of claim 1, wherein the conductors of said first digital multiple conductor connection are unidirectional data lines transmitting from said baseband component to said radio-frequency component.

* * * * *